US012689537B2

(12) United States Patent
Srinivasan et al.

(10) Patent No.: US 12,689,537 B2
(45) Date of Patent: Jul. 21, 2026

(54) SINGLE-PRODUCER-MULTIPLE CONSUMERS SYNCHRONIZATION AND MULTICAST DATA TRANSFER

(71) Applicant: INTERNATIONAL BUSINESS MACHINES CORPORATION, Armonk, NY (US)

(72) Inventors: Vijayalakshmi Srinivasan, New York City, NY (US); Scot Rider, Pleasant Valley, NY (US); Swagath Venkataramani, White Plains, NY (US); Kailash Gopalakrishnan, New York City, NY (US); Sunil K Shukla, Scarsdale, NY (US); Brian William Curran, Saugerties, NY (US); Martin A Lutz, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 17/660,385

(22) Filed: Apr. 22, 2022

(65) Prior Publication Data

US 2023/0344667 A1      Oct. 26, 2023

(51) Int. Cl.
| | |
|---|---|
| *H04L 12/18* | (2006.01) |
| *H04L 41/0826* | (2022.01) |
| *H04L 41/16* | (2022.01) |
| *H04L 41/5019* | (2022.01) |

(52) U.S. Cl.
CPC ........ *H04L 12/185* (2013.01); *H04L 41/0826* (2013.01); *H04L 41/16* (2013.01); *H04L 41/5019* (2013.01)

(58) Field of Classification Search
CPC ... H04L 12/185; H04L 41/0826; H04L 41/16; H04L 41/5019
See application file for complete search history.

(56) References Cited

U.S. PATENT DOCUMENTS

| | | | |
|---|---|---|---|
| 6,330,238 B1 * | 12/2001 | Ooe ................... | H04L 12/1854 |
| | | | 370/432 |
| 6,859,760 B2 | 2/2005 | Dorough | |
| 7,400,596 B1 * | 7/2008 | Robertson .............. | H04L 45/16 |
| | | | 455/518 |

(Continued)

FOREIGN PATENT DOCUMENTS

WO       WO-2008020731 A1 *   2/2008   ......... H04L 12/1868

OTHER PUBLICATIONS

Li et al., "A High-performance low-power nanophotonic on-chip network", Proceedings of the 2009 International Symposium on Low Power Electronics and Design, 2009, San Fancisco, CA, USA, Aug. 19-21, (4 pages).

(Continued)

*Primary Examiner* — Angela Widhalm De Rodriguez
(74) *Attorney, Agent, or Firm* — Daniel M. Yeates

(57) ABSTRACT

Embodiments for providing single-producer-multiple consumers synchronization and multicast data transfer by a processor are disclosed. Multicast data transfer is synchronized based on an identification tag and a request from each one of a plurality of recipients for the multicast data. The multicast data is transferred to each of the plurality of recipients based on the identification tag, the request from each one of the plurality of recipients, and a list of the plurality of recipients.

17 Claims, 6 Drawing Sheets

(56)　　　　　References Cited

U.S. PATENT DOCUMENTS

| | | | |
|---|---|---|---|
| 9,921,870 | B2 | 3/2018 | Gleyzer et al. |
| 10,402,220 | B2 | 9/2019 | Gleyzer et al. |
| 2002/0122427 | A1* | 9/2002 | Kamentsky ...... H04N 21/26291 |
| | | | 348/E7.063 |
| 2017/0134180 | A1* | 5/2017 | Gigliarelli ............. H04L 12/185 |

OTHER PUBLICATIONS

GMO Focus, "Multicast and real-time applications: IGMP, RSVP, RTP", GMD Fokus, (18 pages).

Anonymous, "Method and system for optimizing throughput in data stream processing applications with multiple asynchronous producers and asynchronous consumers", IPCOM000255654D, Oct. 2018 (3 pages).

Anonymous, "Providing a multi-process apply using a shared, consumer/producer work queue", IPCOM000237945D, Jul. 2014 (3 pages).

Anonymous, "A method to prevent the flooding of the consumer in a multiple producers/ single consumer pattern", IPCOM000236877D, May 2014 (3 pages).

* cited by examiner

400

402

SYNCHRONIZATION AND MULTICAST DATA TRANSFER SERVICE

404

SYNCHRONIZATION COMPONENT

16

PROCESSOR

28

MEMORY

406

MULTICAST TRANSFER COMPONENT

408

IDENTIFICATION COMPONENT

410

LIST COMPONENT

SINGLE-PRODUCER-MULTIPLE CONSUMERS SYNCHRONIZATION AND MULTICAST DATA TRANSFER

BACKGROUND

The present invention relates in general to computing systems, and more particularly, to various embodiments for providing single-producer-multiple consumers synchronization and multicast data transfer in a computing environment using a computing processor.

SUMMARY

According to an embodiment of the present invention, a method for providing single-producer-multiple consumers synchronization and multicast data transfer in a computing environment, by one or more processors, is depicted. Multicast data transfer is synchronized based on an identification tag and a request from each one of a plurality of recipients for the multicast data. The multicast data is transferred to each of the plurality of recipients based on the identification tag, the request from each one of the plurality of recipients, and a list of the plurality of recipients.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE DRAWINGS

Figure 1:
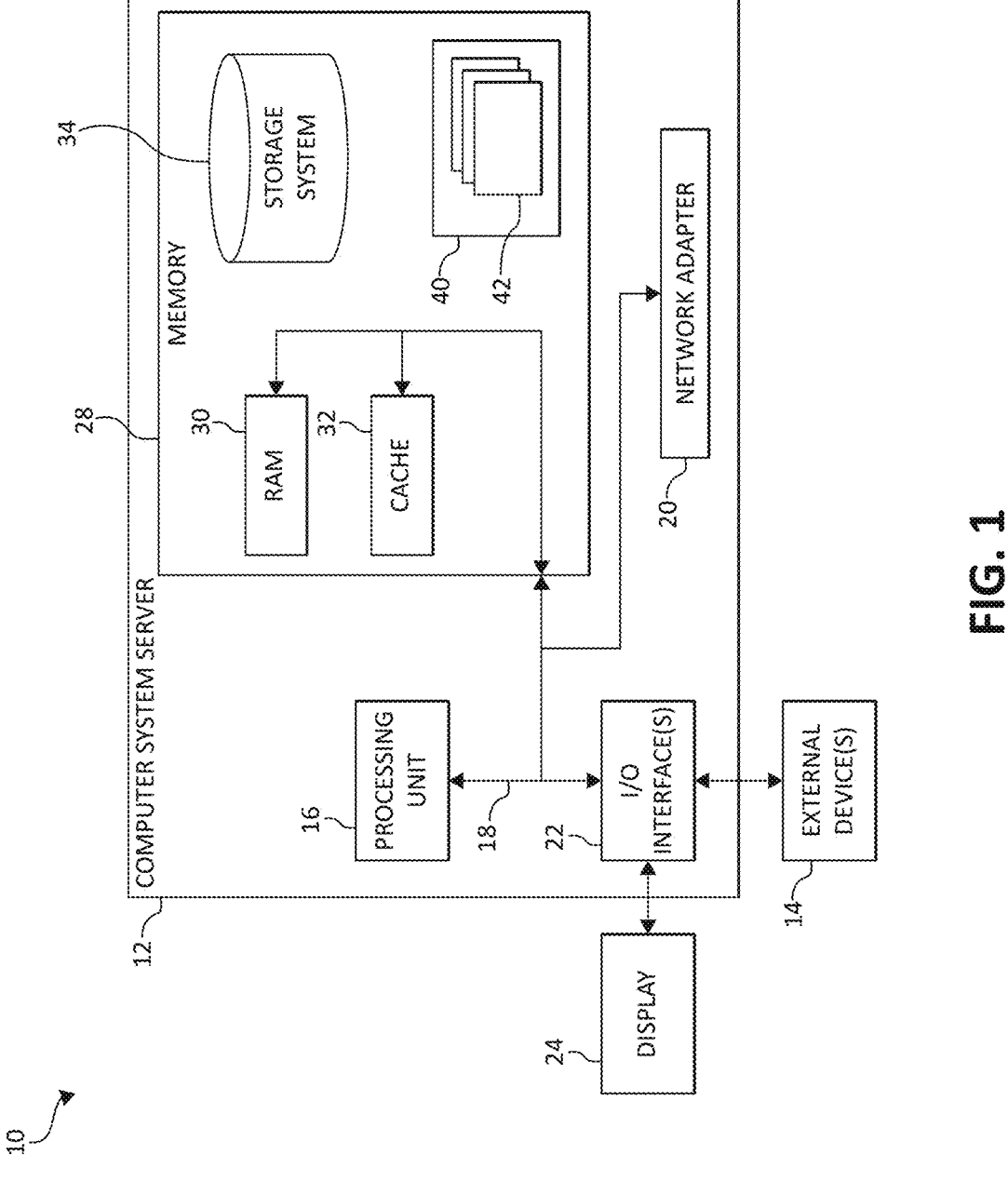
FIG. 1 is a block diagram depicting an exemplary cloud computing node according to an embodiment of the present invention.

In general, data may be transferred as unicast, broadcast or multicast. Unicast is a one-to-one transfer, to wit, from a single sender to a single receiver. For example, all typical Internet application programs are unicast. Broadcast is a one-to-many transmission in a subnetwork. That is, broadcasting is a method of sending the same data to all possible destinations. Unicasting is a method of sending data point-to-point such as, for example, from a single sender to a single receiver. Broadcasting is a method of sending the same data to all possible destinations.

Another multi-destination distribution method, multicasting, sends the same data only to interested destinations called receivers by using special address assignments. Internet Protocol (IP) multicast is the process of multicasting IP packets to several receivers in a single transmission of the IP packet. IP multicast is a technique used to help conserve bandwidth in the data center and reduce the load on servers. Any network traffic directed at that IP address will reach all devices that share the IP address, instead of just one device.

Computers and other devices connected to a network use an internet group management protocol ("IGMP") protocol when those computers, devices, or applications want to join a multicast group. A router that supports IGMP listens to IGMP transmissions from each of the computers, devices, or applications in order to figure out which of the computers, devices, or applications belong to which multicast groups. IGMP uses IP addresses that are set aside for multicasting. Each multicast group shares one of these IP addresses. When a router receives a series of packets directed at the shared IP address, the router will duplicate those packets, sending copies to all members of the multicast group.

In physical network switches and routers that support multicast, the packet may be replaced, and the membership list may be maintained for the members downstream group members. IP hosts use IGMP to report their multicast group memberships to any immediately neighboring multicast routing devices. Multicast routing devices use IGMP to learn, for each of their attached physical networks, which groups have members. Multicast may be used to exploit data sharing behavior amongst multiple consumers, and have a single producer (e.g., owner) of data simultaneously deliver the data to all sharers within a single group. Thus, multicasting is when a group of devices all receive the same messages or packets. Multicasting works by sharing an Internet Protocol (IP) address between multiple devices.

However, current challenges to multicasting is managing synchronization for multi-cast data requests, ensuring that all the consumers are ready to receive the data, and determining and maintaining the list of consumers who share data. Unlike broadcast, when data is sent to all connected consumers, multi-cast communications are sent only to the subset of consumers (data sharers).

Thus, the present invention provides for single-producer-multiple consumers synchronization and multicast data transfer in a computing environment. Multicast data transfer is synchronized based on an identification tag and a request from each one of a plurality of recipients for the multicast data. The multicast data is transferred to each of the plurality of recipients based on the identification tag, the request from each one of the plurality of recipients, and a list of the plurality of recipients.

In other implementations, one or more consumers may preregister with a producer to be part of a multi-cast group. The producer always sends the data to all the registered consumers using multi-cast protocol. Synchronization may be enforced, yet still be lacking because consumers are always ready to receive data. In this way, the present invention provides maximum flexibility for multicasting by requiring each consumer (e.g., receiver) to individually request the multicast data transfer. The producer (e.g., send of the multicast data) enforces synchronization by waiting until all the participating consumers have made the multicast data requests, and then delivers the multicast data in a single group communication.

A common identification tag for each multi-cast request is used by all participating consumers. The producer receives notification and informs about the number of participating consumers in each request. The producer is enabled to construct a list of consumers "on-the-fly" (e.g., in real-time, instantaneously, or an operation completed within a given number of clock cycles) and sends the data to all the participating consumers simultaneously in a group communication.

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations and/or machine learning models/ machine learning pipelines, but there may be a variety of factors that may result in alternate suggestion of a combination of operations and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
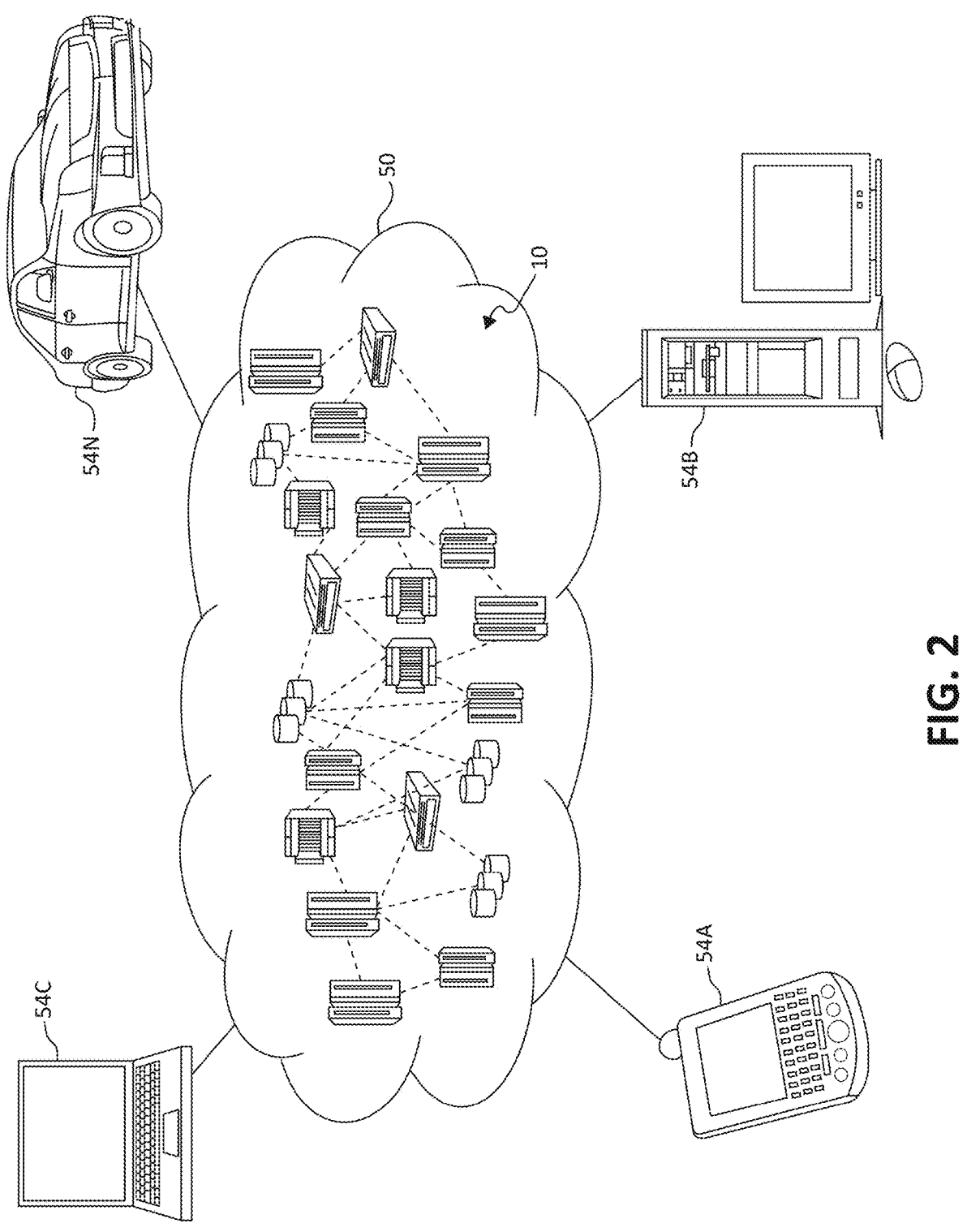
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
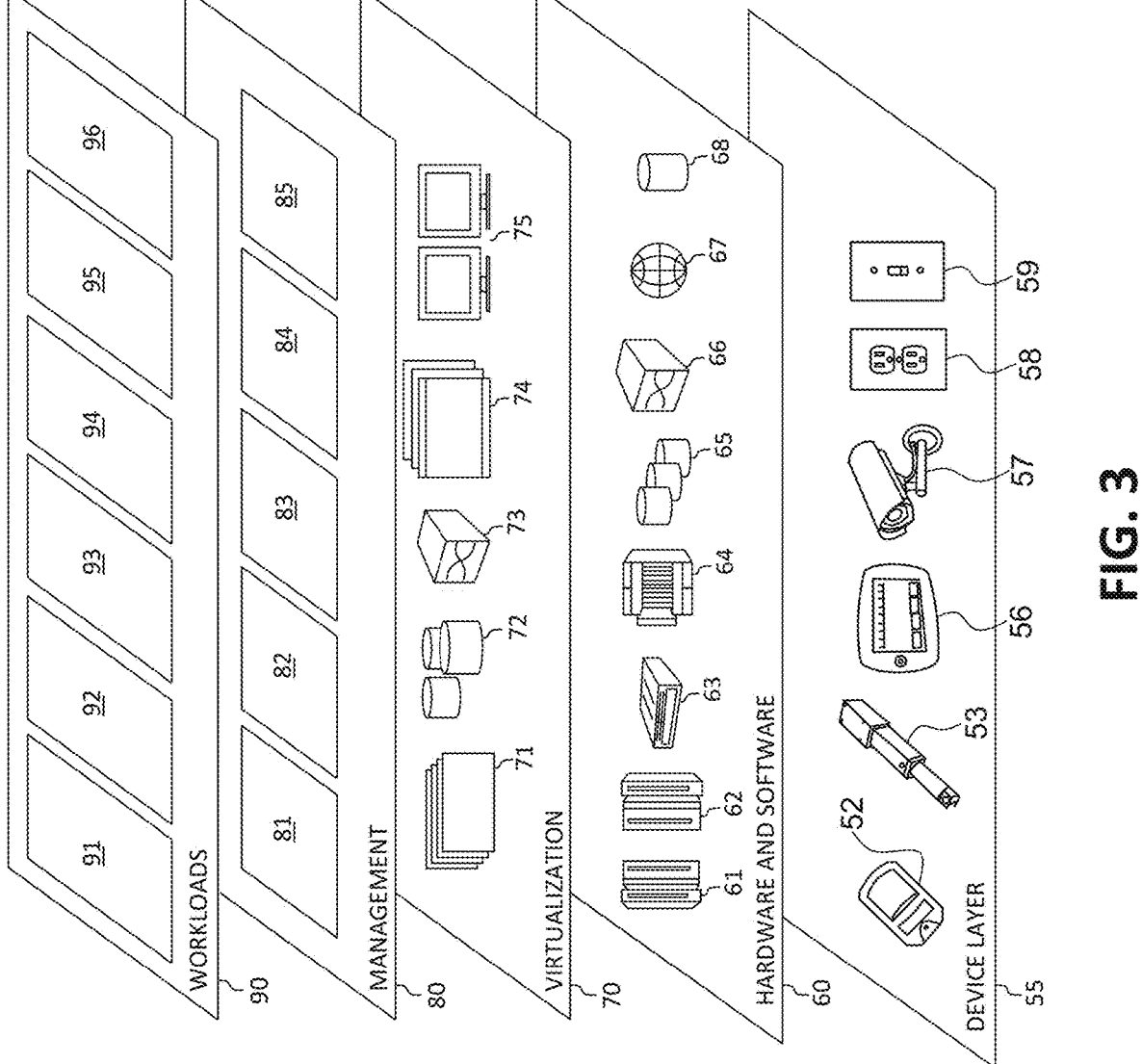
FIG. 3 depicts abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and, in the context of the illustrated embodiments of the present invention, various workloads and functions 96 for providing memory access operations for large graph analytics in a computing environment (e.g., in a neural network architecture). In addition, workloads and functions 96 for providing memory access operations for large graph analytics in a computing environment may include such operations as analytics, deep learning, and as will be further described, user and device management functions. One of ordinary skill in the art will appreciate that the workloads and functions 96 for providing memory access operations for large graph analytics in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing single-producer-multiple consumers synchronization and multicast data transfer in a computing environment by one or more processors in a computing system. Multicast data transfer is synchronized based on an identification tag and a request from each one of a plurality of recipients for the multicast data. The multicast data is transferred to each of the plurality of recipients based on the identification tag, the request from each one of the plurality of recipients, and a list of the plurality of recipients.

Figure 4:
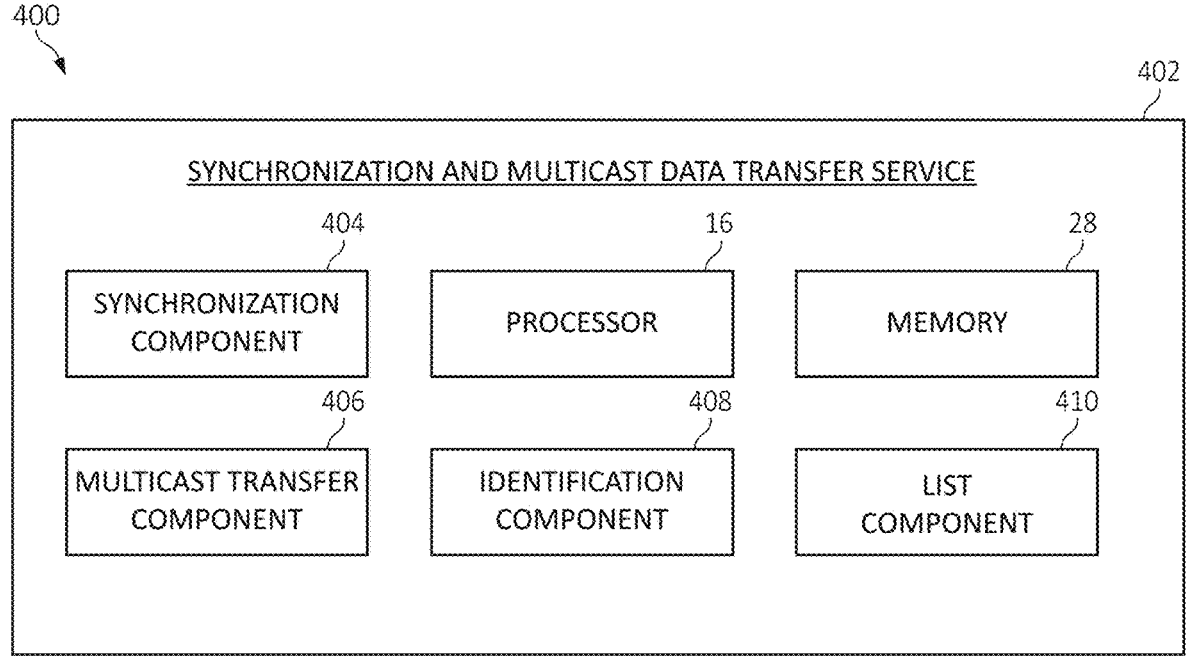
FIG. 4 is an additional block diagram depicting an exemplary functional relationship between various aspects of the present invention.

Turning now to FIG. 4, is a block diagram depicting exemplary functional components of system 400 for providing single-producer-multiple consumers synchronization and multicast data transfer in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In some implementations, computer system/server 12 of FIG. 1 may be included in FIG. 4 and may be connected to other computing nodes over a distributed computing network, where additional data collection, processing, analytics, and other functionality may be realized. The components of computer system/server 12 may include, but are not limited to, one or more processors or processing units 16 ("processor") and/or a system memory 28.

The computer system/server 12 of FIG. 1, may include a synchronization and multicast data transfer service 402, along with other related components in order to provide single-producer-multiple consumers synchronization and multicast data transfer. The synchronization and multicast data transfer service 402 may include a synchronization component 404, a multicast transfer component 406, an identification component 408, and a list component 410. In one aspect, the synchronization and multicast data transfer service 402 may be associated with one or more producers and the receivers may be associated with one or more consumers of the multicast data.

In some implementations, the synchronization and multicast data transfer service 402, using the synchronization component 404, the multicast transfer component 406, the identification component 408, the list component 410, or a combination thereof, may synchronize a multicast data transfer based on an identification tag and a request from each one of a plurality of recipients for the multicast data; and transfer the multicast data to each of the plurality of recipients based on the identification tag, the request from each one of the plurality of recipients, and a list of the plurality of recipients.

The identification component 408 may preregister each of the plurality of recipients to form multicast group. The identification component 408 may determine one or more data sharing patterns between the plurality of recipients. The identification component 408 may form the plurality of recipients as a multicast group based on data sharing patterns.

The identification component 408 may assign the identification tag to the plurality of recipients, wherein the identification tag is a common identification tag associated with the plurality of recipients. The list component 410 may generate a list of destination address of the plurality of recipients.

The synchronization component 404, in association with the multicast transfer component 406, may delay transfer of the multicast data to each of the one or more recipients until receiving the request from each one of the plurality of recipients.

Thus, the synchronization and multicast data transfer service 402, using the synchronization component 404, the multicast transfer component 406, the identification component 408, the list component 410, or a combination thereof, may create a shared/common groups of consumers. The synchronization and multicast data transfer service 402, using the synchronization component 404, the multicast transfer component 406, the identification component 408, the list component 410, or a combination thereof, may analyze a use-case (e.g., application) to determine data sharing patterns and use an application (e.g., software), during program compilation) to form sharer groups offline.

In some implementations, the synchronization and multicast data transfer service 402, using the synchronization component 404, the multicast transfer component 406, the identification component 408, the list component 410, or a combination thereof, may assign a common identification tag to each participating sharers in producer and consumer programs.

In other implementations, the synchronization and multicast data transfer service 402, using the synchronization component 404, the multicast transfer component 406, the identification component 408, the list component 410, or a combination thereof, may construct destination addresses for multi-cast data return and enables a producer to maintain a multi-cast request aggregation table based on the identification tag to collect multi-cast requests from the consumers. In other implementations, the synchronization and multicast data transfer service 402, using the synchronization component 404, the multicast transfer component 406, the identification component 408, the list component 410, or a combination thereof, may receive from each individual consumer a request for receiving the multi-cast data using the common identification tag and number of participating sharers. In other implementations, the synchronization and multicast data transfer service 402, using the synchronization component 404, the multicast transfer component 406, the identification component 408, the list component 410, or a combination thereof, may enable each producer to enforce synchronization by selecting the request for service only when all the participating consumers have individually made the request.

In other implementations, the synchronization and multicast data transfer service 402, using the synchronization component 404, the multicast transfer component 406, the identification component 408, the list component 410, or a combination thereof, may use the requests from consumers to form the destination address list for the multi-cast data response and returns data to the list of destination addresses.

Figure 5:
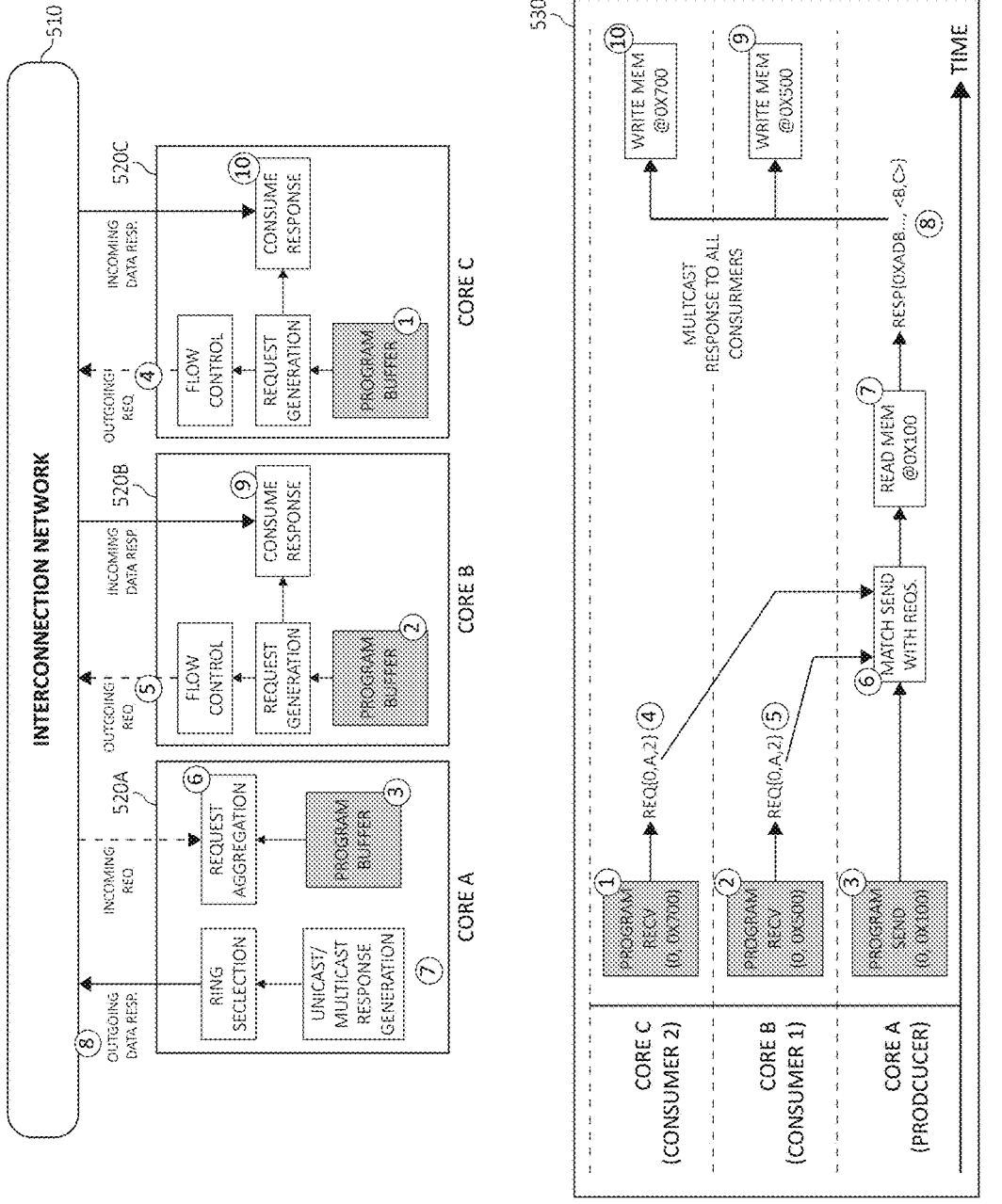
FIG. 5 depicts block flow diagram depicting operations for providing single-producer-multiple consumers synchronization and multicast data transfer in a computing environment according to an embodiment of the present invention.

For further explanation, FIG. 5 is an additional block diagram 500 depicting operations of providing single-producer-multiple consumers synchronization and multicast data transfer in which aspects of the present invention may be realized. In one aspect, one or more of the components, modules, services, applications, and/or functions described in FIGS. 1-4 may be used in FIGS. 5. Repetitive description of like elements, components, modules, services, applications, and/or functions employed in other embodiments described herein is omitted for sake of brevity.

As depicted in FIG. 5, a network such as, for example, an interconnection network 510 is in communication with one or more producers and consumers such as, for example, producer (Core A) 520A and consumer (Core B) 520B and consumer (Core C) 520C.

A corresponding operational graph 530 is also depicted illustrating the operational flows of the hardware of the interconnection network 510 and the producer (Core A) 520A, the consumer (Core B) 520B, and the consumer (Core C) 520C. The operational graph 530 depicts the producer (Core A) 520A, the consumer (Core B) 520B, and the consumer (Core C) 520C on the Y-axis and time on the X-axis.

In steps 1 and 2), both the consumer (Core B) 520B and the consumer (Core C) 520C execute receive instructions, indicating multicast group and local memory address. In step 3 the producer (Core A) 520A executes send instruction, indicating multicast group and local memory address.

In steps 4 and 5), the consumer (Core B) 520B and the consumer (Core C) 520C send request to network with matching tag "A" identifying the multicast request. In step 6, the producer (Core A) 520A aggregates requests with common tag "A" and associates it to SEND instruction of the producer (Core A) 520A. Identifiers of the requesting cores for the common tag are used to construct a target list of cores for the multicast data response. The number of requestors is defined by multicast group identifier.

In step 7), when all requests of multicast group are received, the producer (Core A) 520A may reads memory and (Step 8) sends data response to network. In Steps 9 and 10) the consumer (Core B) 520B and the consumer (Core C) 520C receive data response from network 510 and write to local memory. In some implementations, the producer (Core A) 520A manages synchronization by waiting until a total number of requests for multicast data matches the expected number of consumers such as, for example, the consumer (Core B) 520B and the consumer (Core C) 520C. A RECV instruction defines the multicast group "0" which in turn defines the number of consumers. The SEND instruction in the producer (Core A) 520A could also define the group "0" which in turn defines the number of expected requests. The producer (Core A) 520A may not require a matching SEND instruction, in which case the producer (Core A) 520A is receiving the number of consumers in each request (e.g., step 4).

Also, it should be noted that "local memory address" referenced herein may be the memory address. The local memory address or "memory address" is defined in RECV and SEND instruction (e.g., step 1, 2, 3) and determines where the data are read from in step 7 and written to in steps 9 and 10.

It should be noted that scalability for multicast data transfer is achieved based on independent enforcement of synchronization for each multi-cast request using the identification tag, which allows multiple multi-cast requests to be in-flight concurrently.

Using the unique/common identification tag for each multi-cast request allows multiple active multi-cast requests with different producers. different producers. If the producer (Core A) 520A is always ready to send data (e.g., memory), there may be no requirement to have a program in the producer (Core A) 520A where just the multicast request aggregation and data response as a group communication will be sufficient.

Figure 6:
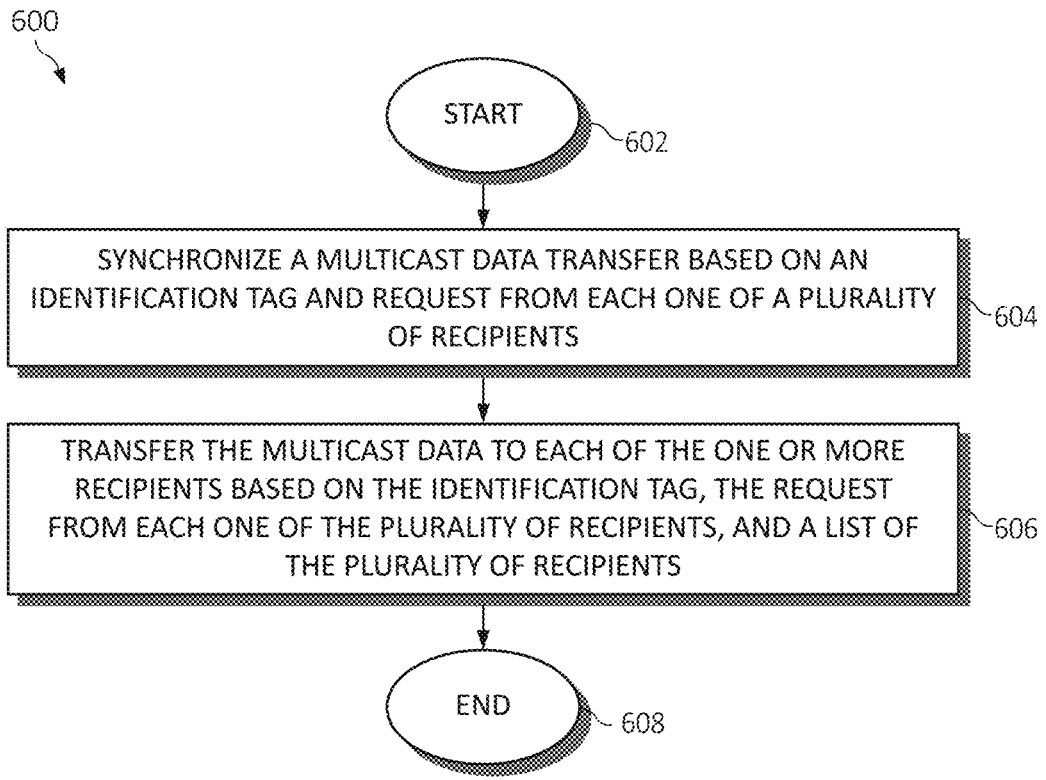
FIG. 6 is a flowchart diagram depicting an exemplary method for providing single-producer-multiple consumers synchronization and multicast data transfer in a computing environment, by a processor, in which aspects of the present invention may be realized.

Turning now to FIG. 6, a method 600 for providing single-producer-multiple consumers synchronization and multicast data transfer in a computing environment using a processor is depicted, in which various aspects of the illustrated embodiments may be implemented. The functionality 600 may be implemented as a method (e.g., a computer-implemented method) executed as instructions on a machine, where the instructions are included on at least one computer readable medium or one non-transitory machine-readable storage medium. The functionality 600 may start in block 602.

Multicast data transfer is synchronized based on an identification tag and a request from each one of a plurality of recipients for the multicast data, as in block 604. The multicast data is transferred to each of the plurality of recipients based on the identification tag, the request from each one of the plurality of recipients, and a list of the plurality of recipients, as in block 606. The functionality 600 may end, as in block 608.

In one aspect, in conjunction with and/or as part of at least one blocks of FIG. 6, the operations of method 600 may include each of the following. The operations of 600 may determine one or more data sharing patterns between the plurality of recipients.

The operations of 600 may preregister each of the plurality of recipients to form multicast group and form the plurality of recipients as a multicast group based on data sharing patterns. The operations of 600 may assign the identification tag to the plurality of recipients, wherein the identification tag is a common identification tag associated with the plurality of recipients.

The operations of 600 may delay transfer of the multicast data to each of the one or more recipients until receiving the request from each one of the plurality of recipients. The operations of 600 may generate a list of destination address of the plurality of recipients.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing single-producer-multiple consumers synchronization and multicast data transfer in a computing environment by one or more processors comprising:

constructing a list of recipients for a multicast group, wherein the constructing is done in real time based on a notification for a multicast request and the list includes a plurality of recipients;

initiating a multicast data transfer that is generated by a producer and is configured to be sent to the plurality of recipients, wherein the plurality of recipients are consumers of the multicast data transfer, and the multicast data transfer is associated with an identification tag;

synchronizing, in response to the initiating and the constructing, the multicast data transfer based on the identification tag and a receiving a request from each one of the plurality of recipients for the multicast data transfer, wherein the identification tag is a common identification tag for the plurality of recipients; and transferring, in response to the synchronizing, the multicast data to each of the plurality of recipients based on the identification tag and the receiving the request from each one of the plurality of recipients, wherein the synchronizing includes delaying the transferring of the multicast data to each of the one or more recipients until the receiving the request from each of the plurality of recipients.

2. The method of claim 1, further including determining one or more data sharing patterns between the plurality of recipients.

3. The method of claim 1, further including forming the plurality of recipients as the multicast group based on data sharing patterns.

4. The method of claim 1, further including assigning the identification tag to the plurality of recipients.

5. The method of claim 1, further including generating a list of destination address of the plurality of recipients.

6. The method of claim 1, wherein the request from each one of the plurality of recipients indicates each recipient is ready to receive the multicast data.

7. The method of claim 6, wherein each request indicates a local memory address for each recipient of the plurality of recipients.

8. A system for providing single-producer-multiple consumers synchronization and multicast data transfer in a computing environment, comprising:

one or more computers with executable instructions that when executed cause the system to:

construct a list of recipients for a multicast group, wherein the construction is done in real time based on a notification for a multicast request and the list includes a plurality of recipients;

initiate a multicast data transfer that is generated by a producer and is configured to be sent to the plurality of recipients, wherein the plurality of recipients are consumers of the multicast data transfer, and the multicast data transfer is associated with an identification tag;

synchronize, in response to the initiation and the construction, the multicast data transfer based on the identification tag and a receiving a request from each one of the plurality of recipients for the multicast data transfer, wherein the identification tag is a common identification tag for the plurality of recipients; and transfer, in response to the synchronization, the multicast data to each of the plurality of recipients based on the identification tag and the receiving the request from each one of the plurality of recipients, wherein the synchronizing includes delaying the transferring of the multicast data to each of the one or more recipients until the receiving the request from each of the plurality of recipients.

9. The system of claim 8, wherein the executable instructions when executed cause the system to determine one or more data sharing patterns between the plurality of recipients.

10. The system of claim 8, wherein the executable instructions when executed cause the system to form the plurality of recipients as the multicast group based on data sharing patterns.

11. The system of claim 8, wherein the executable instructions when executed cause the system to assign the identification tag to the plurality of recipients.

12. The system of claim 8, wherein the executable instructions when executed cause the system to generate a list of destination address of the plurality of recipients.

13. A computer program product for providing single-producer-multiple consumers synchronization and multicast data transfer in a computing environment, the computer program product comprising:

one or more computer readable storage media, and program instructions collectively stored on the one or more computer readable storage media, the program instruction comprising:

program instruction to construct a list of recipients for a multicast group, wherein the construction is done in real time based on a notification for a multicast request and the list includes a plurality of recipients;

program instructions to initiate a multicast data transfer that is generated by a producer and is configured to be sent to the plurality of recipients, wherein the plurality of recipients are consumers of the multicast data transfer, and the multicast data transfer is associated with an identification tag;

program instructions to synchronize, in response to the initiation and the construction, the multicast data transfer based on the identification tag and a receiving a request from each one of the plurality of recipients for the multicast data transfer, wherein the identification tag is a common identification tag for the plurality of recipients; and program instructions to transfer, in response to the synchronization, the multicast data to each of the plurality of recipients based on the identification tag and the receiving the request from each one of the plurality of recipients, wherein the synchronizing includes delaying the transferring of the multicast data to each of the one or more recipients until the receiving the request from each of the plurality of recipients.

14. The computer program product of claim 13, further including program instructions to determine one or more data sharing patterns between the plurality of recipients.

15. The computer program product of claim 13, further including program instructions to:

form the plurality of recipients as the multicast group based on data sharing patterns.

16. The computer program product of claim 13, further including program instructions to assign the identification tag to the plurality of recipients.

17. The computer program product of claim 13, further including program instructions to generate a list of destination address of the plurality of recipients.

* * * * *